United States Patent
Cho et al.

(10) Patent No.: US 12,307,433 B2
(45) Date of Patent: May 20, 2025

(54) ELECTRONIC SHELF LABEL AND METHOD OF CONTROLLING INFORMATION DISPLAY OF THE SAME

(71) Applicant: SOLUM CO., LTD., Yongin-si (KR)

(72) Inventors: Han Jin Cho, Seoul (KR); Hyun Hun Cho, Hwaseong-si (KR); Se Uk Jeon, Suwon-si (KR); Jeong Ho Yoo, Ulsan (KR)

(73) Assignee: SOLUM CO., LTD., Yongin-si (KR)

( * ) Notice: Subject to any disclaimer, the term of this patent is extended or adjusted under 35 U.S.C. 154(b) by 0 days.

(21) Appl. No.: 18/749,051

(22) Filed: Jun. 20, 2024

(65) Prior Publication Data

US 2024/0338672 A1    Oct. 10, 2024

Related U.S. Application Data

(60) Division of application No. 18/199,369, filed on May 19, 2023, now Pat. No. 12,045,795, which is a
(Continued)

(30) Foreign Application Priority Data

Jun. 21, 2019    (KR) .................. 10-2019-0073825

(51) Int. Cl.
G06Q 20/20        (2012.01)
G06Q 10/087       (2023.01)
G09F 3/20         (2006.01)

(52) U.S. Cl.
CPC ......... *G06Q 20/208* (2013.01); *G06Q 10/087* (2013.01); *G09F 3/208* (2013.01); *G06Q 20/203* (2013.01); *G09F 3/204* (2013.01)

(58) Field of Classification Search
CPC .. G06Q 20/208; G06Q 10/087; G06Q 20/203; G09F 3/208; G09F 3/204
See application file for complete search history.

(56) References Cited

U.S. PATENT DOCUMENTS 7,152,040 B1    12/2006  Hawthorne et al.
9,858,453 B2 *   1/2018  Moon ................. G06F 3/14
(Continued)

FOREIGN PATENT DOCUMENTS

KR    10-2012-0066263    6/2012
KR       2015-032230     2/2015
(Continued)

OTHER PUBLICATIONS

Office Action mailed on Sep. 17, 2020 for Korean Patent Application No. 10-2019-0073825 and its English translation provided by Applicant's foreign counsel.
(Continued)

*Primary Examiner* — Gary C Hoge
(74) *Attorney, Agent, or Firm* — WOMBLE BOND DICKINSON (US) LLP

(57) ABSTRACT

Provided is a computing technology for controlling information display of an electronic shelf label that is connected to a management server via a network and displays electronic information. The electronic shelf label measures a distance to at least one product arranged behind the electronic shelf label, and when a change in the distance occurs, activates a wireless tag reader. When product identification information acquired by the wireless tag reader is different from currently displayed product identification information, the electronic shelf labels request a label change registration to a server. Changed product information is received according to the label change registration, and the changed product information is reflected in displayed product information.

4 Claims, 9 Drawing Sheets

Related U.S. Application Data continuation of application No. 16/905,953, filed on Jun. 19, 2020, now Pat. No. 11,657,379.

(56) References Cited

U.S. PATENT DOCUMENTS

| | | | | |
|---|---|---|---|---|
| 2012/0126982 | A1* | 5/2012 | Lee | G06Q 30/06 |
| | | | | 340/572.1 |
| 2013/0234853 | A1* | 9/2013 | H. Kazerouni | G06K 19/0716 |
| | | | | 340/572.1 |
| 2020/0132470 | A1* | 4/2020 | Xu | G06Q 30/0643 |
| 2020/0402429 | A1 | 12/2020 | Cho et al. | |
| 2021/0383312 | A1* | 12/2021 | Nobuoka | G06F 16/55 |
| 2023/0289765 | A1 | 9/2023 | Cho et al. | |

FOREIGN PATENT DOCUMENTS

| | | |
|---|---|---|
| KR | 10-2016-0003998 | 1/2016 |
| KR | 10-1583087 | 1/2016 |
| KR | 10-2016-0030421 | 3/2016 |
| KR | 10-2017-0025321 | 3/2017 |

OTHER PUBLICATIONS

Extended European Search Report dated Sep. 17, 2020 for European Patent Application No. 20181033.0.
Notice of Allowance dated Jan. 12, 2023 for U.S. Appl. No. 16/905,953 (now published as US 2020/0402429).
Notice of Allowance dated May 20, 2024 for U.S. Appl. No. 18/199,369 (now published as US 2023/0289765).
Office Action dated Feb. 9, 2024 for U.S. Appl. No. 18/199,369 (now published as US 2023/0289765).

* cited by examiner

ELECTRONIC SHELF LABEL AND METHOD OF CONTROLLING INFORMATION DISPLAY OF THE SAME

CROSS-REFERENCE TO RELATED APPLICATION(S)

This application is a divisional of U.S. patent application Ser. No. 18/199,369 filed on May 19, 2023, which is a continuation application of U.S. application Ser. No. 16/905,953, filed Jun. 19, 2020 (now U.S. Pat. No. 11,657,379), which claims priority from Korean Patent Application No. 10-2019-0073825, filed on Jun. 21, 2019, in the Korean Intellectual Property Office, the disclosure of which is incorporated herein by reference in its entirety.

BACKGROUND

1. Field

Embodiments of the present invention relate to an electronic shelf label that is connected to a management server via a network and displays electronic information and, more specifically, to a computing technology that controls information display of the electronic shelf label.

2. Description of Related Art

In application sectors, for example, in displaying product information about products displayed in stores, the use of electronic shelf labels is widespread. The electronic shelf label, also referred to as an electronic label or an electronic tag, is connected to a management server through a repeater to receive product information to be displayed, and displays the received product information on an electronic paper display (EPD). Since the electronic shelf label operates at a low power to ensure long time use of a battery and has display information changed through a communication network, the use of the electronic shelf label is spreading in terms of reducing the labor cost of shop management.

When a new product is displayed, an assignment procedure is needed such that an electronic shelf label displays information about the product. In general, when a store manager allows a terminal to read a barcode attached to an electronic shelf label and read a barcode of a product and then transmits the read barcodes to a management server, the management server assigns the corresponding electronic shelf label to the product and registers the electronic shelf label assigned with the product in a database and transmits product information about the product to the electronic shelf label such that display is processed to be changed. Such assignment performed on thousands or tens of thousands of electronic shelf labels is costly and time consuming.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to automating initial assignment or re-assignment of an electronic shelf label.

Embodiments of the present invention relate to automating assignment processing while maintaining a battery life of an electronic shelf label.

Embodiments of the present invention relate to saving labor costs for managing displayed products.

In one general aspect, an electronic shelf label measures a distance to a product arranged behind the electronic shelf label, and when a change in the distance occurs, activates a wireless tag reader. When product identification information acquired by the wireless tag reader is different from currently displayed product identification information, the electronic shelf labels request a label change registration to a server.

In another general aspect, changed product information is received according to the label change registration, and the changed product information is reflected in displayed product information.

In another general aspect, an output from a distance sensor to a controller, upon detection of a change in the distance to the displayed product, may be provided in the form of an interrupt. According to the interrupt, the controller having remained in a sleep state is activated to process the interrupt.

In another general aspect, the distance measured by the distance may be reflected in adjusting the transmission power of a radio frequency identification (RFID).

In another general aspect, when the electronic shelf label finds that only some of pieces of product identification information acquired by activation of an RFID reader are different from corresponding ones of pieces of product identification information matched with identification information of the electronic shelf label, an arrangement error report message may be transmitted to a management server.

Other features and aspects will be apparent from the following detailed description, the accompanying drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The foregoing and additional aspects of the present invention will be embodied through the following exemplary embodiments. It should be understood that various combinations of elements in each exemplary embodiment are possible unless otherwise specified or contradicted within the exemplary embodiment.

Figure 1:
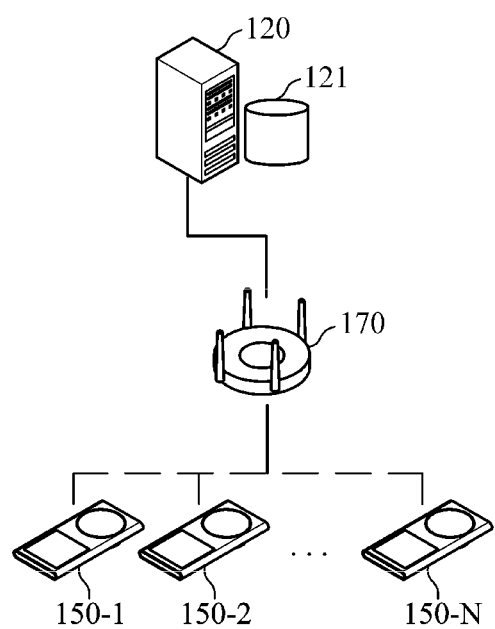
FIG. 1 illustrates a configuration of an exemplary electronic shelf label system employing an electronic shelf label according to an embodiment of the proposed invention.

FIG. 1 illustrates an overall configuration of an electronic shelf label system according to an embodiment of the proposed invention. The electronic shelf label system according to the embodiment includes a management server 120, a repeater 170, and electronic shelf labels 150-1 to 150-N. The electronic shelf labels 150-1 to 150-N are divided into a plurality of groups. The management server 120 manages the respective groups of electronic shelf labels through a plurality of repeaters. FIG. 1 exemplarily illustrates one repeater 170 and several electronic shelf labels 150-1 to 150-N managed by the repeater 170. In the illustrated embodiment, the management server 120 is connected to the repeater 170 in a wired manner.

In order to reduce the power consumption of the electronic shelf label to which power is supplied from a battery, the electronic shelf label maintains a sleep state except for a wakeup period required for information update. The electronic shelf label and the repeater communicate with each other, for example, according to a PHY (physical layer)/MAC (medium access control layer) standard defined in the IEEE 802.15.4 standard. The standard defines sixteen channels in a 2.4 GHz band. The repeater of the electronic shelf labels uses one of the sixteen channels as a wake-up channel, which is a common channel, and allocates the other channels to data communication. During a wake-up period, the electronic shelf label listens to communication from the management server, analyzes a received wake-up frame and, when data to be transmitted to the electronic shelf label exists, tunes to a designated channel to receive and store the received data. The data includes product information.

A display is provided using an electronic paper display (EPD) that maintains an information display state even when no power is supplied. Since the EPD has bistability which maintains a display state for a long time even with interruption of power supply, the EPD is used for an electronic shelf label that requires low power consumption. There are generally known EPDs, including a twist ball type EPD using a hemispherical twist ball filled with electrostatic charges, an electrophoretic display using electrophoresis and microcapsules, and a cholesterol liquid crystal display using cholesterol liquid crystals.

Figure 2:
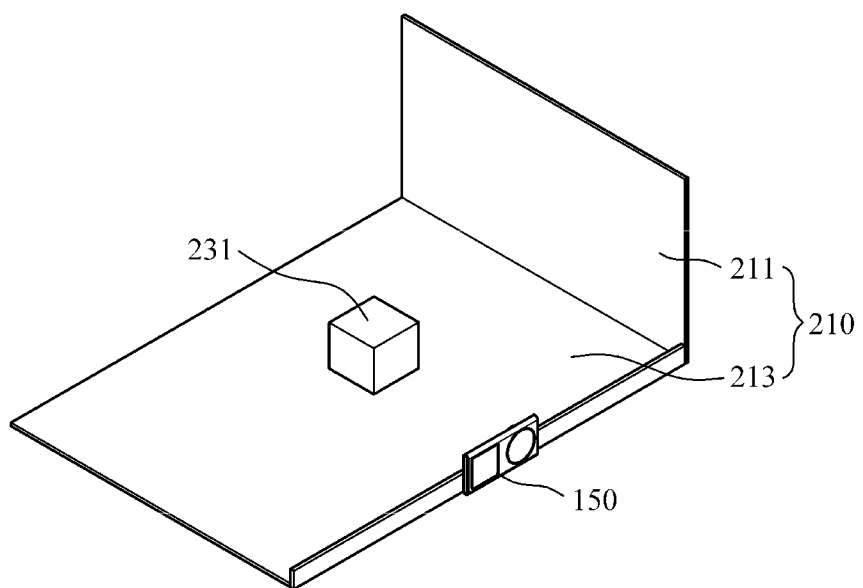
FIG. 2 illustrates a state in which an electronic shelf label is attached to a display stand according to an embodiment.

FIG. 2 illustrates a state in which the electronic shelf label is attached to a display stand according to an embodiment. Referring to FIG. 2, a display space in which products are displayed is divided by side plates 211. The side plate 211 is coated with an electromagnetic shielding coating to prevent communication between radio frequency identification (RFID) attached to products and an electronic shelf label in a next display space from being interfered with or prevent the RFID of the product displayed in the next display space from being unintentionally read. Products 231 are displayed in the display stand space. The electronic shelf label 150 is attached to a front surface of the display stand.

Customers may pick up a product and put down the product in a different place after a few seconds. When a promotional event is held, products on the display stand may be frequently changed. The electronic shelf label according to the proposed invention may detect such a change in real time and reflect a changed state in displayed product information.

Figure 3:
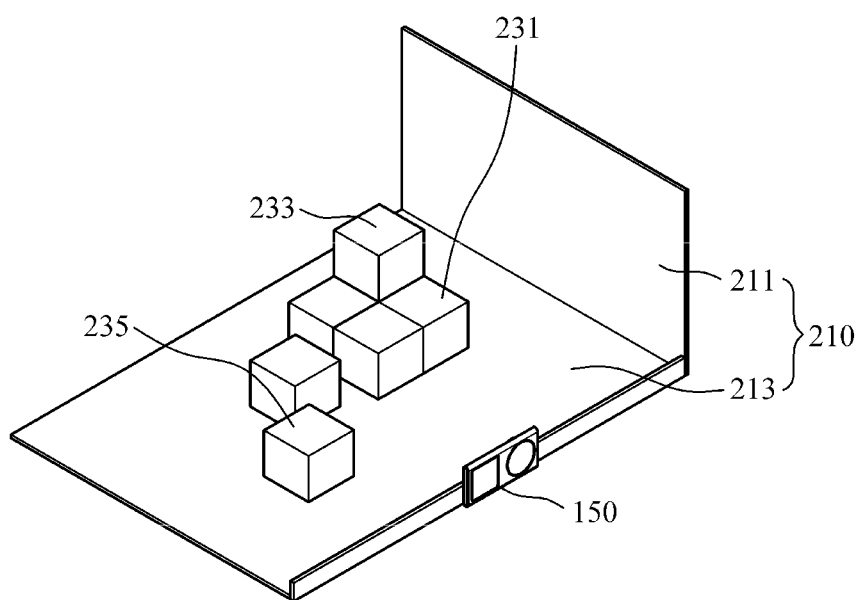
FIG. 3 illustrates a state in which an electronic shelf label is attached to a display stand according to another embodiment.

FIG. 3 illustrates a state in which an electronic shelf label is attached to a display stand according to another embodiment. In the illustrated embodiment, a plurality of the same products 231 to 235 are displayed in the display stand space. The electronic shelf label 150 is attached to the front surface of the display stand.

Among the displayed products, a product 233 is placed at a position higher than that of a product 231, and a product 235 is placed adjacent to the electronic shelf label 150. The position of one of the products 231 to 235 may change, a new product may be placed at an arbitrary position on the display stand, or a product may be sold out and removed. Customers may pick up a product and put down the product in a different place after a few seconds. When a promotional event is held, products on the display stand may be frequently changed. The electronic shelf label according to the proposed invention may detect such a change in real time and reflect a changed state in displayed product information or report the changed state to the management server.

Figure 4:
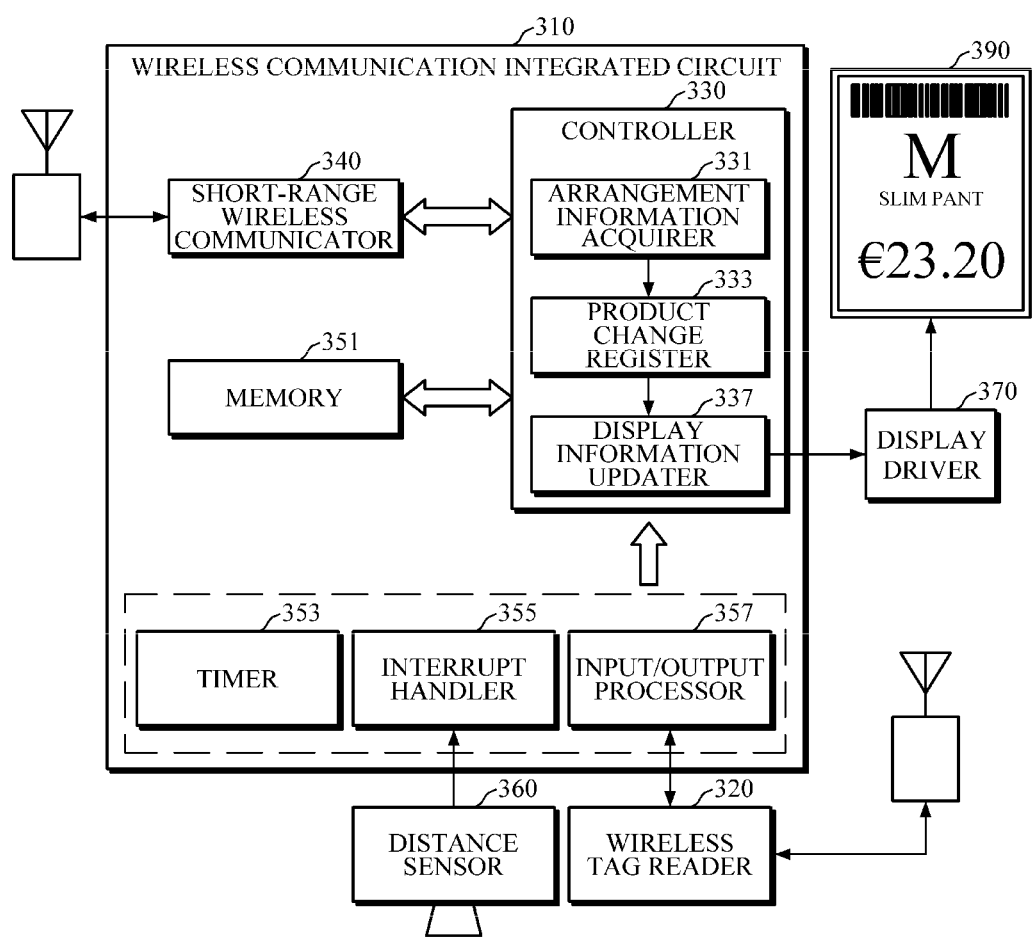
FIG. 4 is a block diagram illustrating a configuration of an electronic shelf label according to an embodiment.

FIG. 4 is a block diagram illustrating a configuration of an electronic shelf label according to an embodiment. In the embodiment, the electronic shelf label is implemented by including a wireless communication integrated circuit 310, a display driver 370, and a display 390.

In the illustrated embodiment, the wireless communication integrated circuit 310 is a system-on-chip (SoC) integrated circuit in which a short-range wireless communicator 340, a memory 351, a controller 330 implemented as a microprocessor, peripheral circuits, and a power circuit are integrated. The wireless communication integrated circuit 310 is operable in two modes, a low power mode and an active mode. In the low power mode, the microprocessor maintains a sleep mode at a low clock frequency. In this case, only some parts of the peripheral circuits, such as an interrupt handler and a timer, remain active, and the remaining parts are not supplied with power.

In the illustrated embodiment, the display driver 370 outputs a driving signal to drive the display 390 implemented as an EPD. The display driver 370 includes a circuit, such as a charge pump, required for driving the EPD 390 and, when display data to be updated or initially displayed is output from the controller 330, generates a driving signal required to operate the display data on the EPD and outputs the generated driving signal. In addition, the display driver 370 has a built-in timer therein and periodically wakes up without involvement of the controller 330 to perform refresh processing on the display data of the EPD 390. However, the proposed invention is not limited to the structure described above and may be implemented by one or a combination of various design methods, such as using dedicated hardware, a gate array, and an individual semiconductor device.

According to an aspect, the electronic shelf label according to the embodiment includes the display 390, the short-range wireless communicator 340, a distance sensor 360, a wireless tag reader 320, and the controller 330. In the illustrated embodiment, the short-range wireless communicator 340 communicates with the repeater according to the PHY/MAC layer standard defined in the IEEE 802.15.4 standard.

The distance sensor 360 measures the distance to a product arranged behind the electronic shelf label. In the illustrated embodiment, the distance sensor 360 is implemented as a time of flight (TOF) distance sensor module. The module may include a sensor configured to detect a change in distance and generate an event, and measure the distance to a product behind the electronic shelf label, and an event generator configured to output an event when the distance measured by the sensor is different from a previously measured and stored distance. The event message may include a changed distance value. In another embodiment, the distance sensor 360 may be a TOF camera or a depth camera. In the embodiment, the distance sensor 360 scans and stores the distance to the product, and when the distance value varies from a previously stored value, detects the change and generates an event.

In the illustrated embodiment, the wireless tag reader 320 may be a reader supporting RFID standards. The wireless tag reader 320 reads a wireless tag attached to a product arranged behind the electronic shelf label. There are known several RFID standards according to the frequency and application field. For example, the wireless tag reader 320 may be a reader, which is adopted in the logistics field, supporting the ISO18000-6 standard in a band of 860 to 960 MHz.

According to an additional aspect, an antenna of the wireless tag reader 320 may be a directional antenna. Accordingly, the wireless tag reader 320 limits the wireless transmission/reception range to a range of arrangement behind the wireless tag reader, thereby preventing interference or inadvertent reading of data.

In the illustrated embodiment, the controller 330 is implemented as a general purpose microprocessor. According to another aspect, the output of the distance sensor 360 may be input to the controller 330 in the form of an interrupt. In the illustrated embodiment, the distance sensor 360 is connected to an interrupt handler 355 of the wireless communication integrated circuit 310. The interrupt handler 355 supplies input interrupts so that corresponding interrupt routines of the controller 330 are activated according to the priority. Since the event output from the distance sensor 360 is processed as an interrupt by the controller 330, the controller 3300 may maintain an inactive mode while consuming only minimal power.

In the drawings, blocks constituting the controller 330 refer to functional modules implemented by a series of consecutive computer programming instructions or a plurality of computer programs that are distributed in a plurality of places. According to one aspect, the controller 330 includes a display information updater 337, an arrangement information acquirer 331, and a product change register 333.

The display information updater 337 controls the display 390 to display product information received from the management server through the short-range wireless communicator 340. The controller 330 remaining in a sleep state periodically wakes up under the control of a timer 353 and executes the display information updater 337 to listen to a channel allocated as a control channel among radio channels. In the illustrated embodiment, the display information updater 337 is implemented as one of timer interrupt routines. The display information updater 337 checks an information update target label list in the received message and, when identification information thereof is found, is switched to an allocated data channel to receive product information and transmits the product information to the display driver 370 to cause the changed product information to be displayed.

The arrangement information acquirer 331, in response to a change in distance detected by the distance sensor 360, activates the wireless tag reader 320 to read product identification information from a wireless tag attached to the product. Since the wireless tag reader 320 reads the wireless tag after activating the passive wireless tag attached to the product by wirelessly transmitting power to the wireless tag, the wireless tag reader 320 has a power consumption that is too large to operate on a battery of an electronic shelf label. According to an aspect of the proposed invention, power is not normally supplied to the wireless tag reader 320, but is supplied to activate the wireless tag reader 320 only when an event is generated by the distance sensor 360 under the control of the arrangement information acquirer 331.

In the illustrated embodiment, when an event is output from the distance sensor 360, the corresponding interrupt routine of the controller 330 is executed. Accordingly, the controller 330 may be activated and process various functions started by the arrangement information acquirer 331.

According to an additional aspect, the arrangement information acquirer 331 may adjust the transmission power of the wireless tag reader 320 in consideration of the distance to the product measured by the distance sensor 360. Since the transmission power of the wireless tag reader 320 affects battery consumption, when the transmission power is adjusted by reflecting the changed distance to the product, power consumption may be further optimized.

The product change register 333 transmits label assignment change request information to the management server when the product identification information acquired by the arrangement information acquirer 331 is different from currently displayed product identification information. Since this is a case where the electronic shelf label has been assigned a new product, there is a need to rapidly receive new product information and change the displayed information.

When the product change register 333 transmits the label assignment change request information to the management server, the management server registers a change of the product identification information assigned to the corresponding electronic shelf label in a management database and transmits product information of the changed product. Accordingly, the changed product information is received by the display information updater 337, which is periodically executed, and the changed information is displayed on the display 390.

In the illustrated embodiment, the product change register 333 transmits the label assignment change request information to the management server through the short-range wireless communicator 340. However, the proposed invention is not limited thereto, and an additional modem or communication device for transmitting the request information may be provided.

The memory 351, among non-described reference numerals, stores an operating program of the electronic shelf label and data. In the embodiment, the memory 351 is a flash memory in which power consumption is low and data is maintained even when power of a battery is not supplied. However, the present invention is not limited thereto, and other generally known types of semiconductor memories may be adopted.

Figure 5:
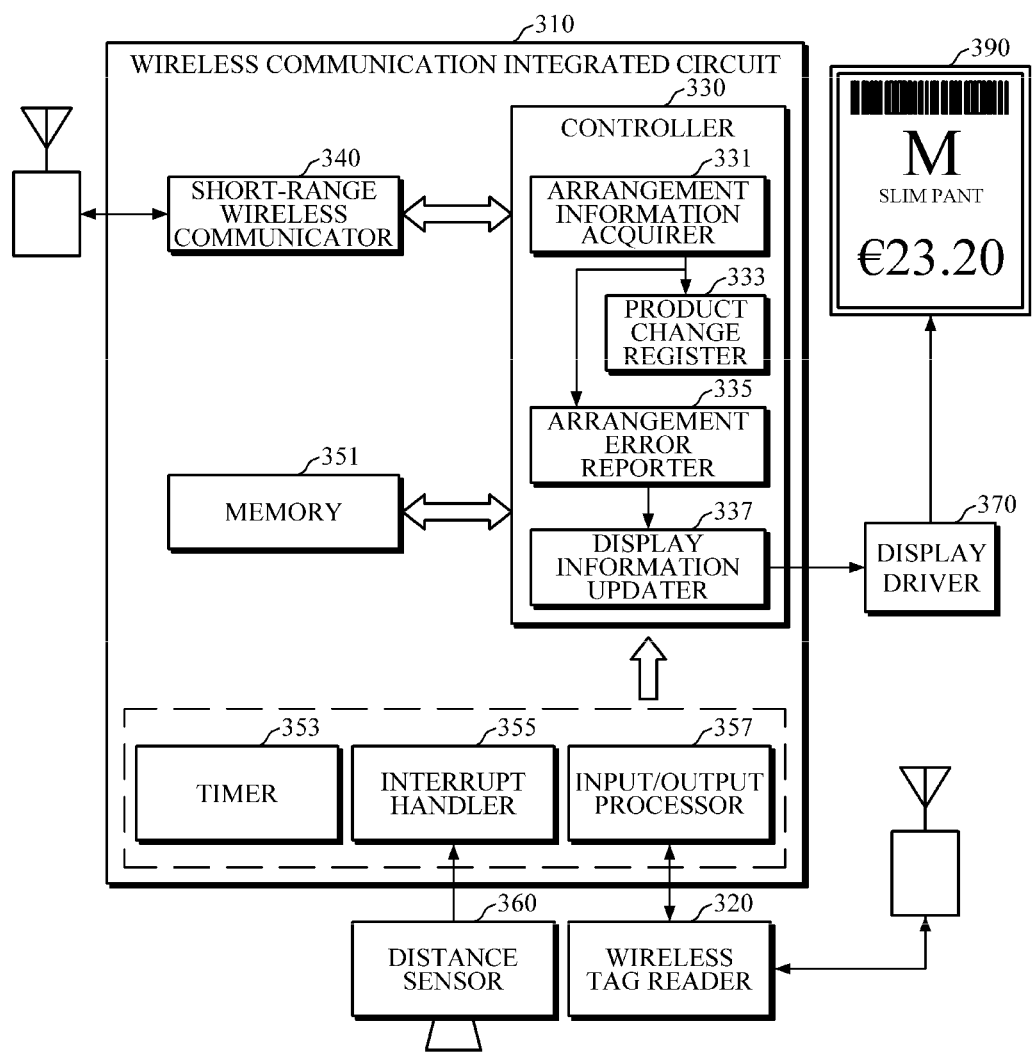
FIG. 5 is a block diagram illustrating a configuration of an electronic shelf label according to another embodiment.

FIG. 5 is a block diagram illustrating a configuration of an electronic shelf label according to another embodiment. In the illustrated embodiment, the configurations of a wireless communication integrated circuit 310, a display driver 370, and a display 390 are similar to those in the embodiment illustrated in FIG. 4.

In the illustrated embodiment, a distance sensor 360, unlike in the embodiment of FIG. 4, may measure the distances to a plurality of products arranged behind the electronic shelf label. In the illustrated embodiment, the distance sensor 360 may be a TOF camera or a depth camera. In the embodiment, the distance sensor 360 scans and stores the distances to a plurality of products behind the electronic shelf label, and in response to a change made in one or more distance values, detects the change and generates an event. The event message may include the changed one or more distance values and coordinate information thereof. For example, the coordinate information may be coordinates of pixels of an image sensor.

In the illustrated embodiment, the wireless tag reader 320 may be a reader supporting RFID standards. The wireless tag reader 320 may read a plurality of wireless tags attached to a plurality of products arranged behind the electronic shelf label. For example, the wireless tag reader 320 may scan a plurality of wireless tags while sweeping a communication range in a lateral direction or in a vertical direction by controlling the directivity of the antenna and gradually increasing the transmission power. As another example, the wireless tag reader 320 may read tag information from all wireless tags that respond to the wireless tag reader 320 and collect the read tag information.

According to another aspect, the controller 330 includes a display information updater 337, an arrangement information acquirer 331, and a product change register 333.

The arrangement information acquirer 331, in response to a change in distance detected by the distance sensor 360, activates the wireless tag reader 320 to read product identification information from a wireless tag attached to the product. According to an additional aspect, the arrangement information acquirer 331 may adjust the transmission power of the wireless tag reader 320 in consideration of the distance to the product measured by the distance sensor 360. The product change register 333 transmits label assignment change request information to the management server when the product identification information acquired by the arrangement information acquirer 331 is different from currently displayed product identification information. In the illustrated embodiment, since the displayed product includes a plurality of products, the product identification information acquired by the arrangement information acquirer 331 may be provided as pieces of product identification information. When all of the acquired plurality of pieces of product identification information are different from the currently displayed product identification information, it is determined that the displayed products have been changed by a store manager or the like. Even when a majority of the acquired plurality of pieces of product identification information are different from the currently displayed product identification information, it may be also determined that the displayed products have been changed. This is a case where the electronic shelf label has been assigned new products, so there is a need to rapidly receive new product information and change the displayed information.

When the product change register 333 transmits label assignment change request information to the management server, the management server registers a change of product identification information assigned to the corresponding electronic shelf label in a database and transmits product information of the changed product. Accordingly, the changed product information is received by the display information updater 337, which is periodically executed, and the changed information is displayed on the display 390.

In the illustrated embodiment, the product change register 333 transmits the label assignment change request information to the management server through the short-range wireless communicator 340. However, the proposed invention is not limited thereto, and an additional modem or communication device for transmitting the request information may be provided.

According to an additional aspect, the electronic shelf label may further include an arrangement error reporter 335. The arrangement error reporter 335, upon finding that only some of the pieces of product identification information acquired by the arrangement information acquirer 131 are different from corresponding ones of the pieces of product identification information matched with identification information of the electronic shelf label, transmits an arrangement error report message to the management server 120. For example, the arrangement error report message may include position or identification information about the display stand and identification information about the product determined as an error. When one or only a few pieces of acquired product identification information are different from the previously stored product identification information, it may be considered that a customer has picked up the product and put down the product incorrectly or that the product has been mistakenly displayed. Upon receiving the arrangement error report message, the management server may check the position from identification information about the display stand and transmit the arrangement error report message together with the position information to a store manager terminal such that the store manager moves to the corresponding position and corrects the display. In order to help the store manager find the corresponding display stand, the electronic label may have a flashing indication or a light emitting diode (LED) may be embedded in a bezel frame of the electronic shelf label to emit a specific color.

Figure 6:
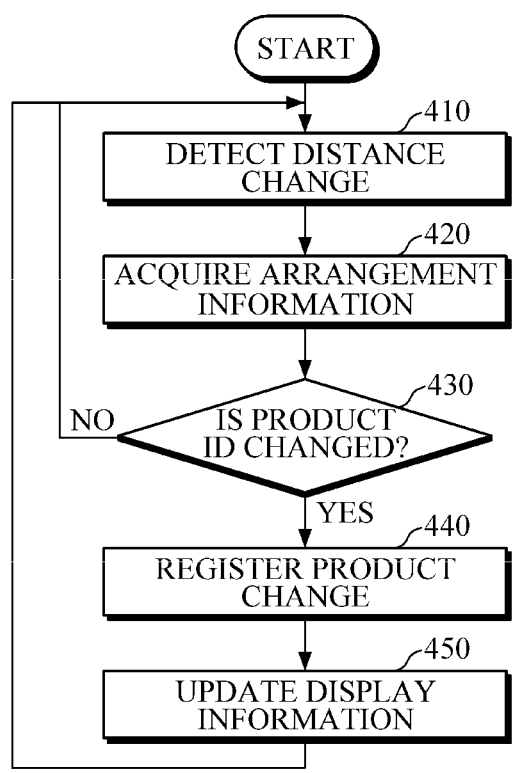
FIG. 6 is a flowchart showing a procedure of a method of controlling information display of an electronic shelf label according to an embodiment.

FIG. 6 is a flowchart showing a procedure of a method of controlling information display of an electronic shelf label according to an embodiment. The method of controlling information display of the electronic shelf label according to the embodiment is implemented by a microprocessor and control logics that execute parts and computer program instructions in the electronic shelf label that communicates with a management server through a gateway. As illustrated in FIG. 6, the method of controlling information display of the electronic shelf label according to the embodiment includes a distance change detecting operation (410), an arrangement information acquisition operation (420), a product change registration operation (440), and a display information update operation (450).

In the distance change detecting operation 410, the electronic shelf label detects a change in distance to a product displayed on a display stand behind the electronic shelf label. The electronic shelf label measures the distance to the product on the display stand behind the electronic shelf label through a distance sensor and compares the measured distance with a previously measured and stored result to determine whether the distance has been changed.

In the arrangement information acquisition operation 420, the electronic shelf label activates a wireless tag reader to read product identification information from a wireless tag attached to the product. Thereafter, the electronic shelf label compares the read product identification information with previously stored product identification information (430). When it is determined from operation 430 that the product identification information of the displayed product has changed, the product change registration operation 440 is performed. When it is not determined from operation 430 that the product identification information of the displayed product has changed, the position of the product is considered as having been slightly changed on the display stand, and thus the method moves back to the distance change detecting operation 410. In the product change registration operation 440, the electronic shelf label transmits label assignment change request information to the management server when the acquired product identification information is different from currently displayed product identification information. This is a case where the electronic shelf label needs to be assigned a new product, so there is a need to rapidly receive new product information and change the displayed information.

In the display information update operation 450, the electronic shelf label receives product information about the product assigned through a change registration from the management server and controls the display to display the received product information thereon. When the electronic shelf label transmits label assignment change request information to the management server, the management server registers a change of the product identification information assigned to the corresponding electronic shelf label in a management database and transmits product information of the changed product. The electronic shelf label wakes up in a wake-up period to receive the changed product information and displays the changed product information on the display.

Figure 7:
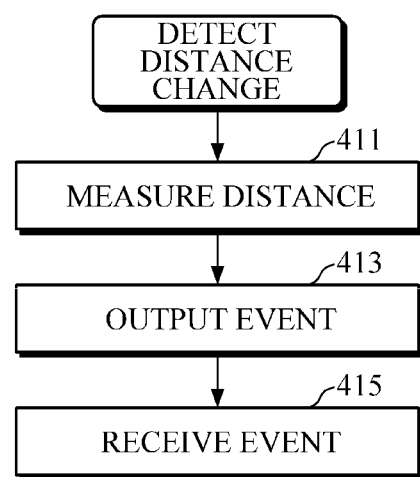
FIG. 7 is a flowchart showing an example of a distance change detecting operation shown in FIG. 6.

FIG. 7 is a flowchart showing an example of the distance change detecting operation shown in FIG. 6. As illustrated in FIG. 7, the distance change detecting operation 410 may include a distance measurement operation 411, an event output operation 413, and an event reception operation 415. In the distance measurement operation 411, a sensor measures the distance to a product behind the electronic shelf label. In the event output operation 413, the electronic shelf label outputs an event when the distance measured by the sensor is different from a previously measured and stored distance. In the event reception operation 415, a microprocessor receives the event output by the sensor. According to an additional aspect, in the event reception operation 415, the microprocessor may receive the event output by the sensor through an interrupt port.

Figure 8:
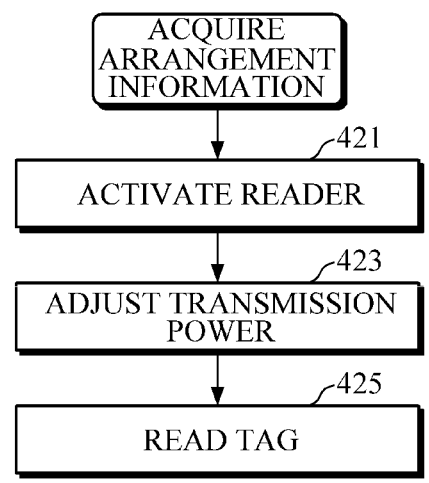
FIG. 8 is a flowchart showing an example of an arrangement information acquisition operation shown in FIG. 6.

FIG. 8 is a flowchart showing an example of the arrangement information acquisition operation 420 shown in FIG. 6. As illustrated in FIG. 6, the arrangement information acquisition operation 420 may include a reader activation operation 421, a transmission power adjustment operation 423, and a tag reading operation 425. In the reader activation operation 421, the electronic shelf label activates a wireless tag reader. In the transmission power adjustment operation 423, the electronic shelf label adjusts the transmission power of the wireless tag reader in consideration of the distance to the product measured from the distance sensor. In the case of a long distance to the product, the transmission power is increased, and in the case of a short distance to the product, the power is reduced so that the power consumption is reduced. In the tag reading operation 425, the electronic shelf label reads product identification information from a wireless tag attached to the product through the wireless tag reader.

Figure 9:
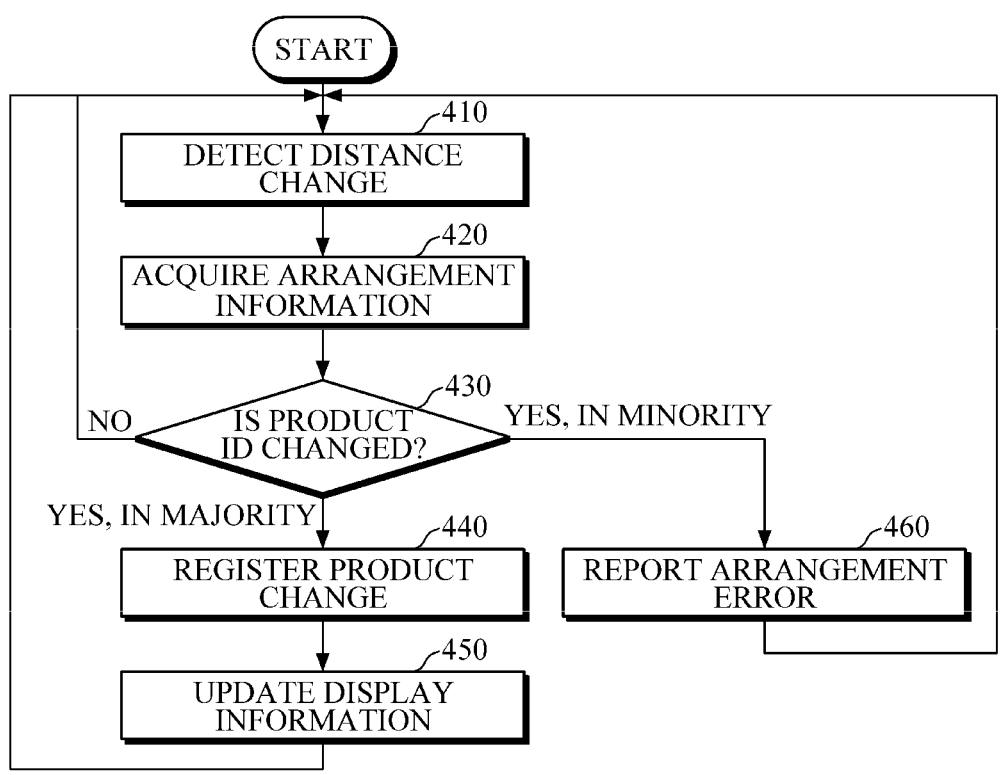
FIG. 9 is a flowchart showing a procedure of a method of controlling information display of an electronic shelf label according to another embodiment.

FIG. 9 is a flowchart showing a procedure of a method of controlling information display of an electronic shelf label according to another embodiment. The method of controlling information display of the electronic shelf label according to the illustrated embodiment includes a distance change detecting operation 410, an arrangement information acquisition operation 420, a product change registration operation 440, and a display information update operation 450.

In the distance change detecting operation 410, the electronic shelf label may capture an image of products on a display stand behind the electronic shelf label with a TOF camera or a depth camera, distinguish the products from each other in the image, and calculate the distance to each product to determine whether a change in distance exists.

In the arrangement information acquisition operation 420, the electronic shelf label activates a wireless tag reader to read product identification information from a wireless tag attached to the product. When a plurality of products are displayed on the display stand, the product identification information may be provided as pieces of product identification information. Thereafter, the read product identification information is compared with previously stored product identification information (430). When it is determined from the comparison that most of the pieces of product identification information have changed, the product change registration operation 440 is performed. In the product change registration operation 440, the electronic shelf label transmits label assignment change request information to the management server when the acquired product identification information is different from currently displayed product identification information. Since the displayed product includes a plurality of products, the product identification information acquired by the arrangement information acquirer 331 may be provided as pieces of product identification information. When all of the acquired plurality of pieces of product identification information is different from the currently displayed product identification information, it is determined that the displayed products have been changed by a store manager or the like. Even when a majority of the acquired plurality of pieces of product identification information is different from the currently displayed product identification information, it may be also determined that the displayed products have been changed. This is a case where the electronic shelf label needs to be assigned new products, so there is a need to rapidly receive new product information and change the displayed information. The display information update operation 450 is similar to the corresponding configuration of the embodiment shown in FIG. 6.

According to another aspect, the method of controlling information display of the electronic shelf label may further include an arrangement error reporting operation 460. In the arrangement error reporting operation 460, upon finding that only some of the pieces of the product identification information acquired in the arrangement information acquisition operation 420 are different from corresponding ones of pieces of product identification information matched with identification information of the electronic shelf label, the electronic shelf label transmits an arrangement error report message to the management server. For example, the arrangement error report message may include position or identification information about the display stand and identification information about the product determined as an error. When one or only a few pieces of acquired product identification information are different from the previously stored product identification information, it may be considered that a customer has picked up the product and put down the product incorrectly or the product has been mistakenly displayed. Upon receiving the arrangement error report message, the management server may check the position from identification information about the display stand and transmit the arrangement error report message together with the position information to a store manager terminal so that the store manager moves to the corresponding position and corrects the display. In order to help the store manager find the corresponding display stand, the electronic label may have a flashing indication or a light emitting diode (LED) may be embedded in a bezel frame of the electronic shelf label to emit a specific color.

As is apparent from the above, labor costs and time required for registering information about an electronic shelf label can be saved. In addition, human resources required for inventory management and display state management can be saved.

Although the exemplary embodiments of the present invention have been described in the specification and the accompanying drawings, the exemplary embodiments are intended to not limit the technical spirit of the present invention, and those skilled in the art should appreciate that various substitutions, modifications, and changes are possible without departing from the scope and spirit of the present invention, and all modifications and equivalents come within the scope of the appended claims.

What is claimed is:

1. A method of controlling an electronic shelf label, the method comprising:
    measuring, by a distance sensor in the electronic shelf label, a distance from the distance sensor to a product;
    determining that the distance is same or shorter than a first distance;
    in response to a determination that the distance is same or shorter than a first distance, turning a wireless tag reader active,
    reading, by the wireless tag reader in the electronic shelf label, information indicated on a wireless tag attached to the product;
    displaying, by a display in the electronic shelf label, the information.

2. The method of claim 1, wherein when the distance is same or shorter than the first distance, the wireless tag reader maintains an inactive state.

3. An electronic device, comprising:
    a distance sensor, a wireless tag reader, a display, and a controlling circuitry,
    wherein the controlling circuitry is configured to:
    measure, by the distance sensor, a distance from the distance sensor to a product;
    determine that the distance is same or shorter than a first distance;
    in response to a determination that the distance is same or shorter than a first distance, turn the wireless tag reader active;
    read, by the wireless tag reader, information indicated on a wireless tag attached to the product;
    display, by the display, the information.

4. The electronic device of claim 3, wherein the controlling circuitry is configured to, when the distance is same or shorter than the first distance, cause the wireless tag reader to maintain an active state.

* * * * *